United States Patent
Sheppard et al.

(10) Patent No.: US 9,464,853 B2
(45) Date of Patent: Oct. 11, 2016

(54) HEAT EXCHANGER WITH INTEGRATED THERMAL BYPASS VALVE

(71) Applicant: Dana Canada Corporation, Oakville (CA)

(72) Inventors: Jeff Sheppard, Milton (CA); Sachin Bhatia, Mississauga (CA); Michael Bardeleben, Oakville (CA); Dario Bettio, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 724 days.

(21) Appl. No.: 13/725,134

(22) Filed: Dec. 21, 2012

(65) Prior Publication Data

US 2013/0160972 A1 Jun. 27, 2013

Related U.S. Application Data

(60) Provisional application No. 61/579,313, filed on Dec. 22, 2011.

(51) Int. Cl.
| | | |
|---|---|---|
| *G05D 23/00* | (2006.01) | |
| *F28F 27/00* | (2006.01) | |
| *F16K 31/00* | (2006.01) | |
| *F28F 27/02* | (2006.01) | |
| *F28D 9/00* | (2006.01) | |
| *F28D 21/00* | (2006.01) | |

(52) U.S. Cl.
CPC ............ *F28F 27/00* (2013.01); *F16K 31/002* (2013.01); *F28D 9/005* (2013.01); *F28F 27/02* (2013.01); *F28D 2021/0089* (2013.01); *F28F 2250/06* (2013.01); *Y10T 137/7737* (2015.04)

(58) Field of Classification Search
CPC ...... F28F 27/00; F28F 27/02; F28F 2250/06; F28D 9/005; F28D 2021/0089; F16K 31/002
USPC .................................................. 165/287, 297
See application file for complete search history.

(56) References Cited

U.S. PATENT DOCUMENTS

| | | | |
|---|---|---|---|
| 4,537,346 A | 8/1985 | Duprez | |
| 4,964,376 A * | 10/1990 | Veach | F01M 5/007 165/297 |
| 5,423,373 A * | 6/1995 | Ramberg | F02M 31/10 165/297 |
| 5,810,071 A | 9/1998 | Pavlin | |
| 5,950,715 A | 9/1999 | Jonsson et al. | |
| 6,161,614 A * | 12/2000 | Woodhull, Jr. | F28D 1/05333 165/297 |
| 6,182,749 B1 | 2/2001 | Brost et al. | |
| 7,487,826 B2 * | 2/2009 | Pineo | F01M 5/00 165/103 |

(Continued)

FOREIGN PATENT DOCUMENTS

WO 2004092552 A2 10/2004

*Primary Examiner* — Ljiljana Ciric
(74) *Attorney, Agent, or Firm* — Marshall & Melhorn, LLC

(57) ABSTRACT

A heat exchanger apparatus containing a heat exchanger, a fitting at the fluid inlet and a thermally actuated bypass valve positioned in a fluid inlet manifold of the heat exchanger. The valve contains a sleeve having first and second slots, that permit fluid flow from a fluid inlet to a bypass or fluid inlet manifold. A drum positioned within the sleeve is movable from a first to a second position, and has an aperture that permits fluid flow to the first or second slot. An actuator engages the drum and actuates it to move from the first to the second position. The sleeve further contains a lip positioned between the fitting and a bypass channel cover plate for affixing the sleeve in position.

18 Claims, 7 Drawing Sheets

(56) References Cited

U.S. PATENT DOCUMENTS

| | | | | |
|---|---|---|---|---|
| 7,854,256 B2* | 12/2010 | Pineo | | F01M 5/00 |
| | | | | 165/297 |
| 8,839,748 B2* | 9/2014 | Kim | | F01P 7/16 |
| | | | | 165/297 |
| 8,960,269 B2* | 2/2015 | Cheadle | | F01M 5/00 |
| | | | | 165/297 |
| 9,255,748 B2* | 2/2016 | Cho | | F28F 27/02 |
| 9,309,655 B2* | 4/2016 | Brown | | E03C 1/0408 |
| 9,347,448 B2* | 5/2016 | Kock | | B60T 17/04 |
| 9,353,998 B2* | 5/2016 | Willis | | F28F 9/02 |
| 2003/0019620 A1* | 1/2003 | Pineo | | F01M 5/00 |
| | | | | 165/297 |
| 2006/0124114 A1* | 6/2006 | Sayers | | F02M 25/0729 |
| | | | | 123/568.12 |
| 2014/0246173 A1* | 9/2014 | Cheadle | | F28F 27/02 |
| | | | | 165/103 |
| 2014/0251579 A1* | 9/2014 | Sloss | | F01N 5/02 |
| | | | | 165/96 |
| 2014/0262200 A1* | 9/2014 | Sheppard | | G05D 23/1852 |
| | | | | 165/297 |

\* cited by examiner

HEAT EXCHANGER WITH INTEGRATED THERMAL BYPASS VALVE

CROSS-REFERENCE TO RELATED APPLICATION

This application claims the benefit of and priority to U.S. Provisional patent application No. 61/579,313, filed Dec. 22, 2011. The content of the above-noted patent application is hereby expressly incorporated by reference into the detailed description hereof.

FIELD OF THE INVENTION

The specification relates to a heat exchanger apparatus having an integrated thermal bypass valve (TBV).

BACKGROUND OF THE INVENTION

Heat exchanger systems that vary the path of fluid flowing through the heat exchanger in response to a change in the characteristics (e.g. temperature, pressure, etc.) of the fluid are known. For example, WO 94/29659 shows a plate-type oil cooler which has a pressure-responsive valve assembly connected to the inlet of the oil-side to permit the oil to bypass the oil-side of the cooler when the pressure on the oil-side of the cooler exceeds a predetermined value. Alternatively, U.S. Pat. No. 4,669,532 discloses a bimetallic valve which is disposed in the oil-side of an oil-cooler to permit the oil to bypass the oil-side of the cooler when the temperature of the oil is below a predetermined value.

Additionally, there are numerous examples of heat exchanger systems wherein the flow rate of a fluid flowing through a heat exchanger is controlled according to the temperature of that of another fluid flowing through the heat exchanger. For example, German Laid-Open Application No. 196 37 818 and European Laid-Open Application No. 787 929 show two such systems wherein the flow of coolant through an oil cooler is controlled in response to the temperature of the oil flowing through the heat exchanger. In both of the systems, a thermostat is located upstream of the inlet to measure the oil temperature before the oil enters the heat exchanger, although it is also known to control the flow of coolant through the heat exchanger system in response to the oil temperature as it exits the heat exchanger.

The problem with these systems is that they may take up considerable amounts of space, which is always at a premium in automotive applications, a primary use of this art. Additionally, these systems may add weight to the vehicle to which they are attached, possibly degrading fuel economy thereby. Furthermore, the environment surrounding the thermostat in these systems may affect the oil temperature reading, causing more or less coolant to be directed to the heat exchanger than is actually necessary.

SUMMARY OF THE INVENTION

According to one aspect of the present application, there is provided a heat exchanger apparatus containing:
a heat exchanger, containing
a plurality of plates defining a first fluid channel, a second fluid channel and a bypass channel;
first fluid inlet and outlet manifolds having first fluid inlet and outlet, respectively, the first fluid inlet and outlet manifolds being in fluid communication with the first fluid channel; and, the first fluid inlet manifold also being in fluid communication with the bypass channel; and
a thermal bypass valve positioned in the first fluid inlet manifold, the thermal bypass valve containing:
a sleeve having a first slot and a second slot, the first slot permitting fluid flow from the first fluid inlet to the bypass channel, and the second slot permitting fluid flow from the first fluid inlet to the first fluid inlet manifold;
a drum positioned within the sleeve and slidably movable from a first position to a second position, the drum having a first aperture and one or more additional apertures, the first aperture in fluid communication with the first fluid inlet and the one or more additional apertures directing fluid to the first slot or the second slot in the first or second position; and
a thermal actuator engaging the drum and actuating the drum to move from the first position to the second position in response to the temperature of the first fluid.

According to another aspect of the present application, there is provided a thermal bypass valve containing:
a sleeve having a first slot and a second slot;
a drum positioned within the sleeve and slidably movable from a first position to a second position, the drum having a first aperture and one or more additional apertures, the first aperture in fluid communication with a first fluid inlet and the one or more additional apertures directing fluid to the first slot or the second slot in the first or second position; and
a thermal actuator engaging the drum and actuating the drum to move from the first position to the second position in response to the temperature of a first fluid.

DESCRIPTION

The present description discloses, as an embodiment, a heat exchanger apparatus having a heat exchanger and a thermally actuated bypass valve positioned within the heat exchanger.

An oil-to-water (OTW) heat exchanger, where a water-based heat exchange fluid such as engine coolant, is used to heat or cool oil. When combined with a suitable valve as disclosed herein, an OTW heat exchanger can be used either as an oil cooler, or oil warmer. In an OTW cooler configuration, where heat is transferred from the oil to the coolant, the oil flows through the heat exchanger in the hot state and bypasses the heat exchanger in the cold state. In an OTW heater configuration, where heat is transferred from the coolant to the oil, the oil flows through the heat exchanger in the cold state and bypasses the heat exchanger in the hot state. An OTW heater can help to accomplish rapid warm-up of the oil from a cold start condition, knowing that the engine coolant heats up more quickly than the oil.

In accordance with the embodiment of the present specification, the thermally actuated bypass valve (TBV) is internally mounted within the heat exchanger, and which can help to reduce the overall amount of space required by the heat exchanger apparatus. In a further embodiment in accordance with the specification, the heat exchanger apparatus includes a TBV mounted in an oil inlet fitting and/or oil inlet manifold of the heat exchanger.

Figure 1:
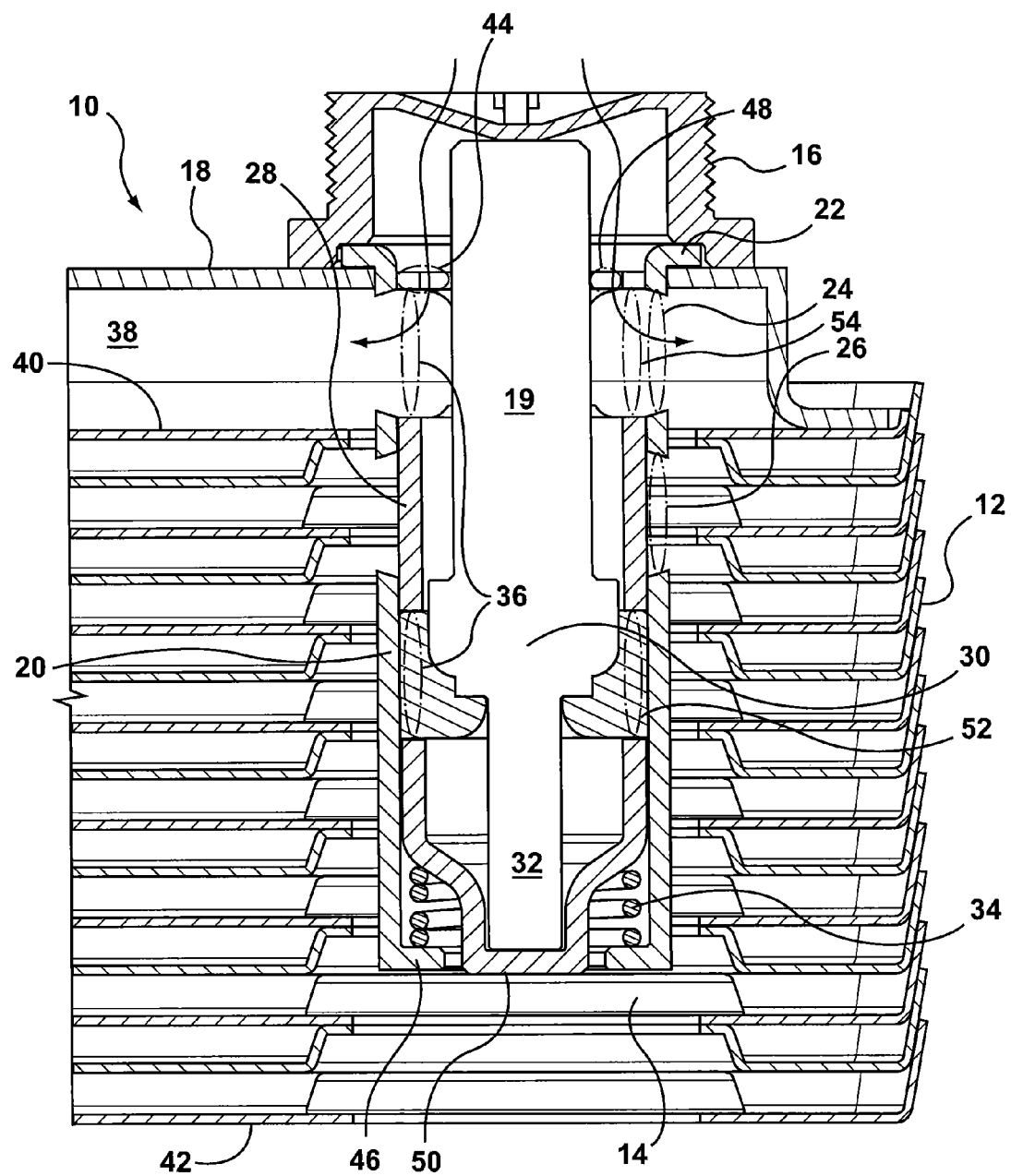
FIG. 1 shows a cross-section of a portion of an oil-to-water (OTW) heater with an internally mounted thermal bypass valve (TBV) in the hot (i.e., oil hotter than the valve actuation set point temperature) condition, with oil flowing through the bypass channel.
Figure 2:
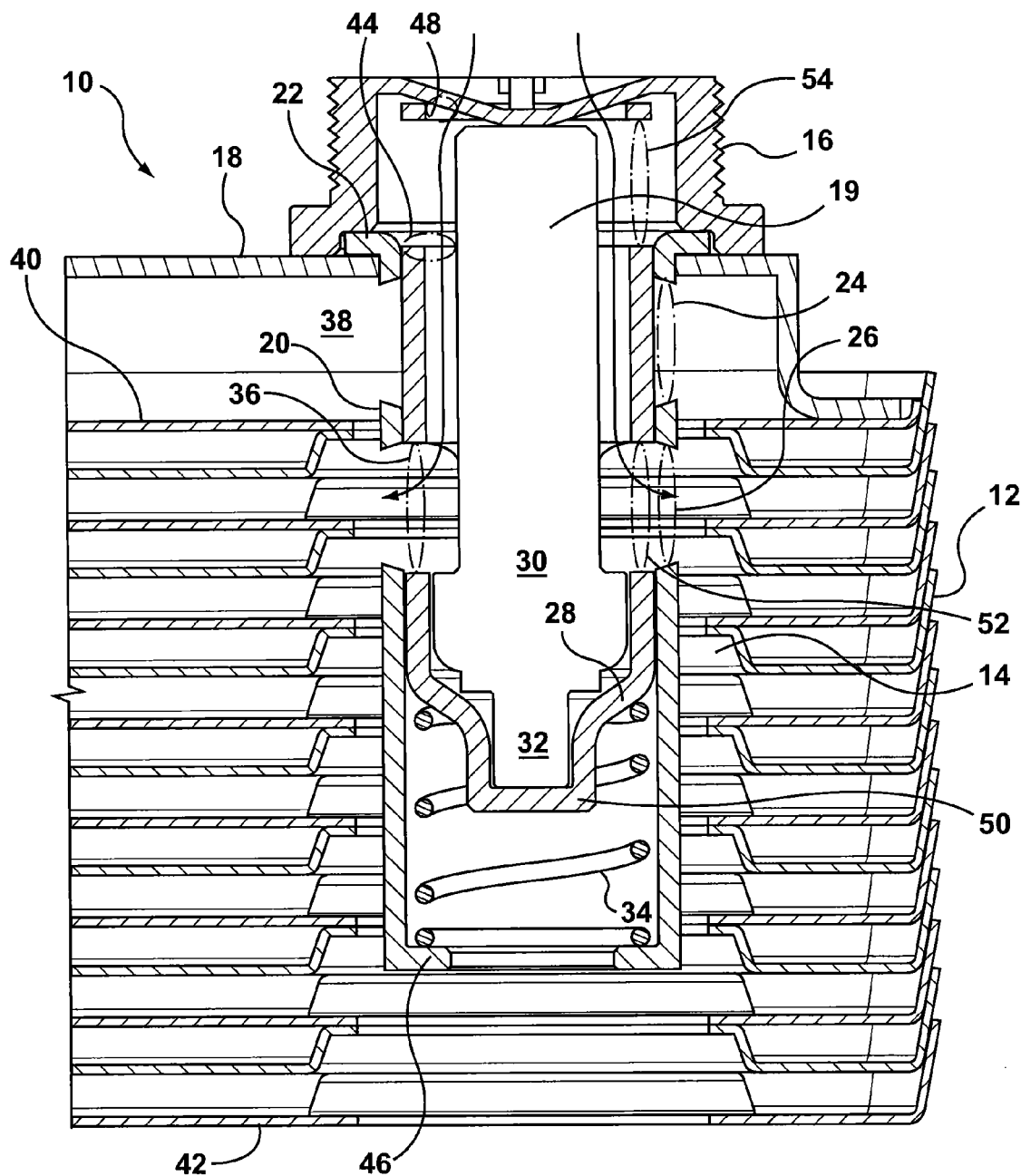
FIG. 2 shows the OTW heater of FIG. 1 in the cold (oil colder than valve set point temperature) condition, with oil flowing through the heat exchanger.

The embodiments in accordance with the specification will now be described with reference to the figures. FIGS. 1 and 2 show a cross-section of a portion of an OTW heater 10 containing a core 12 made up of a plurality of dished heat exchanger plates. The type of plates used is not particularly limited and provide for a first fluid channel, a second fluid channel and a bypass channel 38. For instance, and as disclosed in the embodiments in FIGS. 1 to 4, the first and second fluid channels are formed by a plurality of nested dish plates, which in one embodiment can be identical. The first fluid channel, as disclosed herein, can provide a passage for flow of oil, while the second fluid channel can provide a passage for flow of a coolant or other liquid, for heat exchange. The bypass channel 38, as disclosed herein, can be formed by a generally flat plate 40 positioned above the nested dish plates and a bypass channel cover plate 18. The bottom of the heater 10 can be provided with another nested flat bottom dish plate 42 to enclose the heater 10.

In one embodiment, the heater 10 can be provided with inlet and outlet manifolds for both the coolant and oil, but only the oil inlet manifold 14 is shown in the drawings herein. The oil inlet manifold 14 and oil outlet manifold are in fluid communication with oil flow passages in core 12 for flow of the first fluid. While the coolant inlet manifold and coolant outlet manifold (not shown) are fluid communication with the second channel, permitting flow of the coolant. In the embodiment disclosed, the manifold 14 is closed at its bottom and receives oil through its upper end from an oil inlet 44, to which can be coupled an oil inlet fitting 16. The fitting 16 is attached to the top of a bypass channel cover plate 18, and is provided with an opening for the oil entry. As disclosed herein, in one embodiment, the bypass cover plate 18 may cover the entire top of the core 12.

In the embodiment disclosed, the bypass channel 38 is present above the dished heat exchanger plates and close to the oil inlet fitting 16. However, the bypass channel 38 could also be positioned, for example and without limitation, below the core 12 of the heat exchanger plates with the fitting 16 attached to a top plate of the dished heat exchanger plates.

Received inside the oil inlet fitting 16 and the oil inlet manifold 14 is a thermal bypass valve (TBV) 19 having an outer sleeve 20, generally in the form of a cylinder. The outer sleeve 20 is closed at its bottom end 46, which is further away from the oil inlet 44 or can be open and provided with a flange extension for retaining a biasing means, as explained further herein and as shown in the figures. In one embodiment and as disclosed in the figures, a major portion of the thermal bypass valve is retained in position within the oil inlet manifold 14. In a further embodiment, the top of sleeve 20 has a lip 22 which is retained between the fitting 16 and cover plate 18, for affixing the sleeve 20 and the TBV 19 in place in the oil inlet manifold 14. The outer sleeve 20 is provided with upper slots 24 (or first slot) (encircled in FIGS. 1-4 and 7) and lower slots 26 (or second slot) (encircled in FIGS. 1-4, 6 and 7) for reasons which will become apparent below. The slotted outer sleeve 20 is more clearly shown in FIGS. 5-7.

In the embodiment disclosed in the figures, the upper slots 24 of the sleeve permits fluid flow from the oil inlet 44 to the bypass channel 38. While the lower slots 26 in the sleeve permit fluid flow from the oil inlet 44 to the oil inlet manifold 14, and from there, entering the core 12 of the dished heat exchanger plates for heat exchange.

Figure 3:
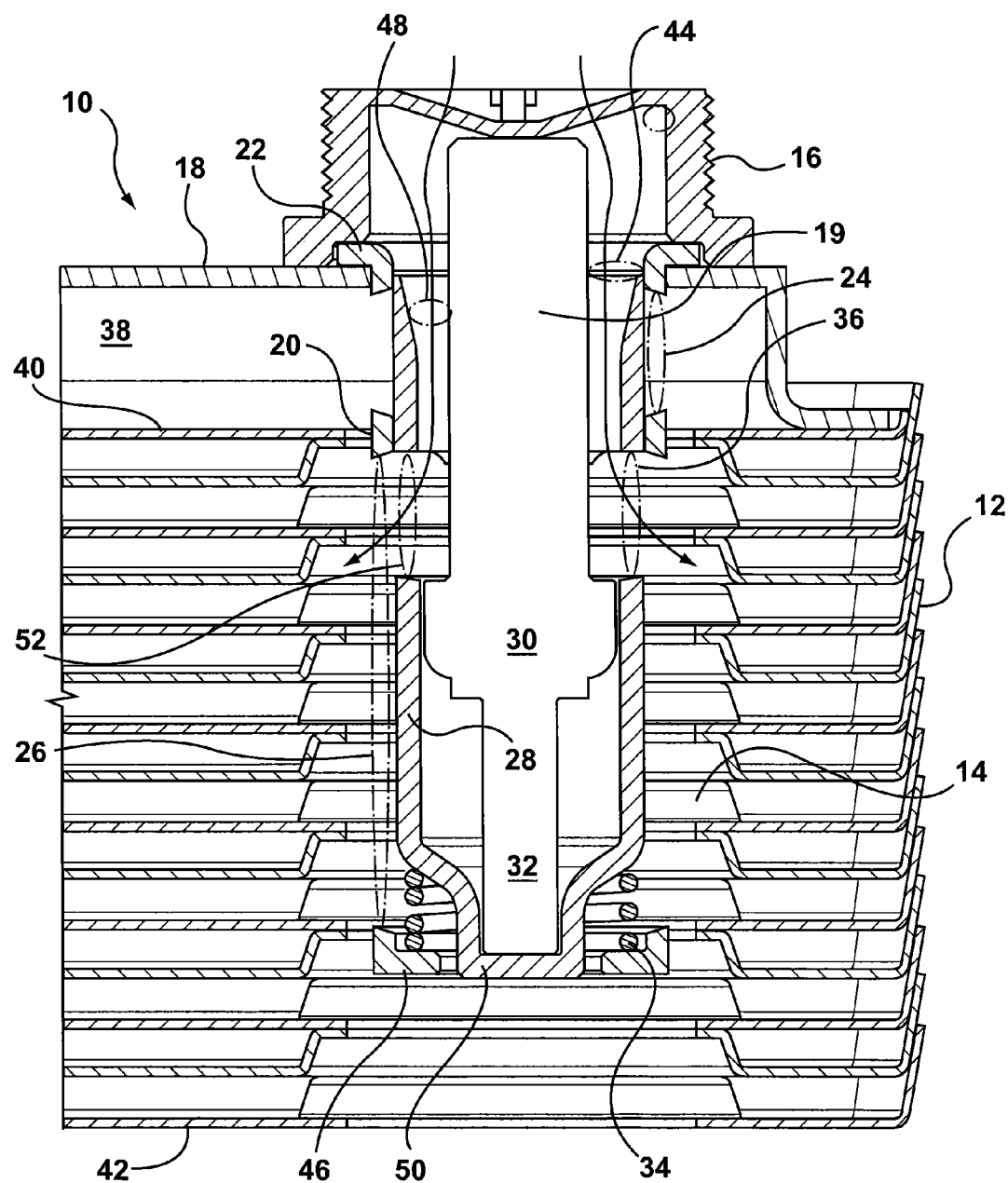
FIG. 3 shows a cross-section of a portion of an OTW cooler with an internally mounted TBV in the hot condition, with oil flowing through the heat exchanger.
Figure 5:
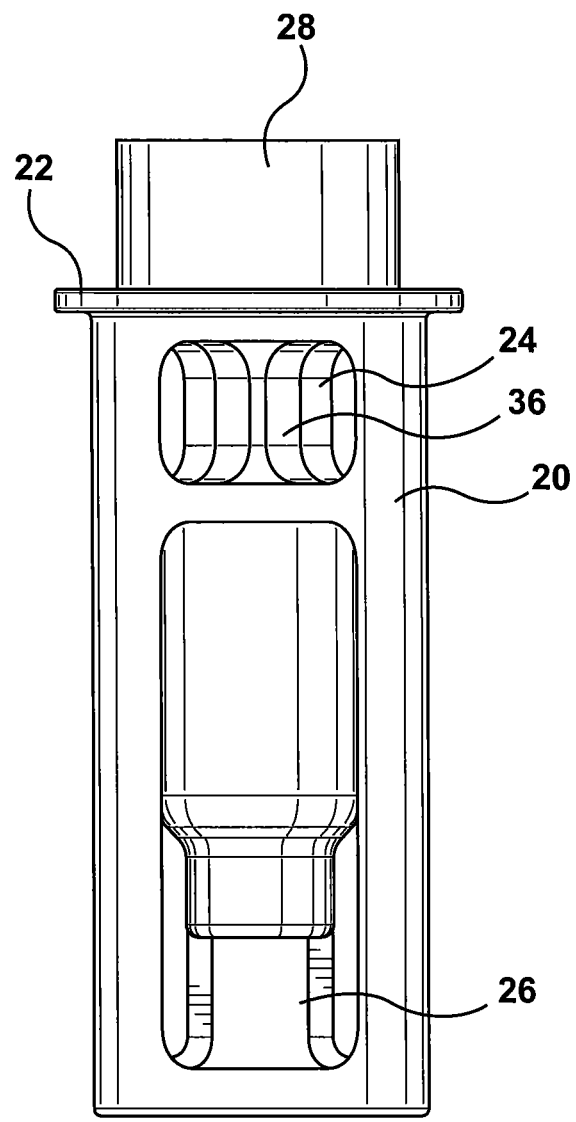
FIG. 5 shows a plan view of a thermal bypass valve in accordance with one embodiment, for use in a OTW cooler, with the drum in the first position.
Figure 6:
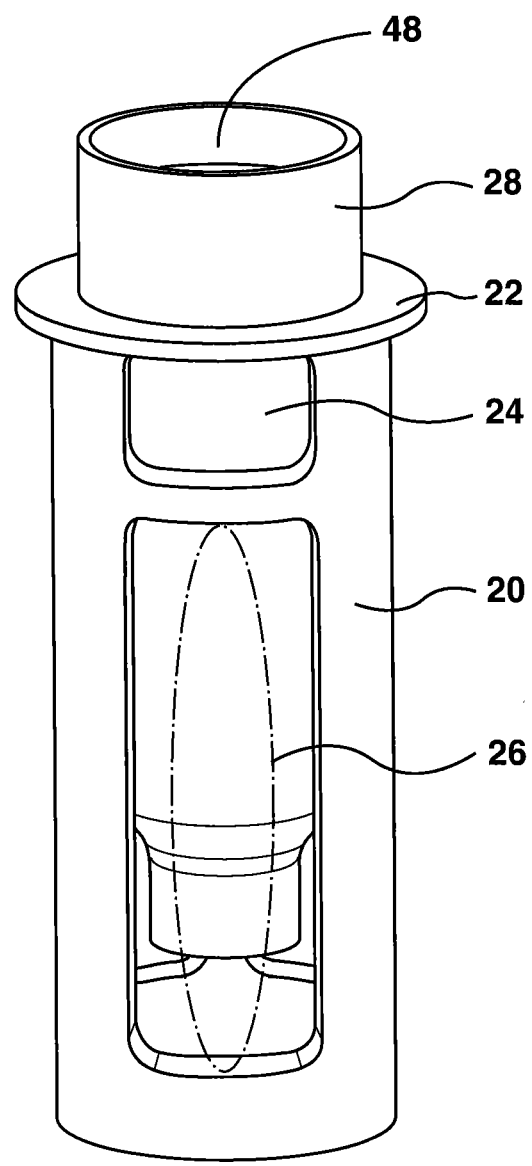
FIG. 6 shows a thermal bypass valve in accordance with an embodiment, for use in a OTW cooler, with the drum in the first position.
Figure 7:
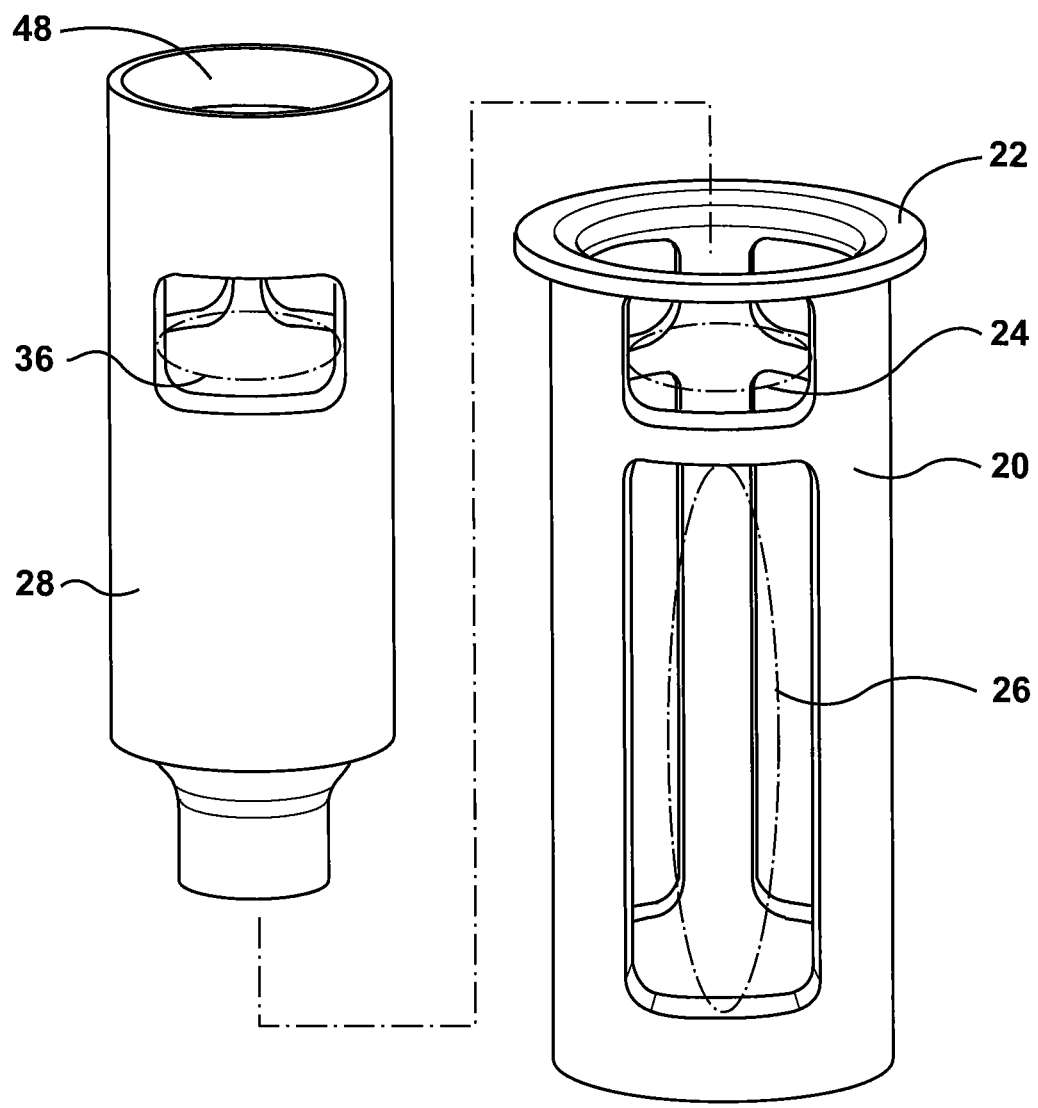
FIG. 7 shows the sleeve and drum of a thermal bypass valve in accordance with an embodiment shown in FIG. 6.

Located inside the outer sleeve 20 is a drum 28 that can slidably move within the sleeve 20 from a first position (FIGS. 2 and 4) to a second position (FIGS. 1 and 3). The drum 28 has a first aperture 48 (encircled in FIGS. 1-3) that is in fluid communication with the first fluid inlet 44 (encircled in FIGS. 1-3) or opening in the oil inlet fitting 16 to allow the fluid, such as oil, to enter the drum. In addition, the drum 28 is also provided with one or more apertures 36 (encircled in FIGS. 1-4 and 7), such as a second aperture 52 or a second 52 and third 54 aperture, for reasons which will become apparent below. The drum 28 is also shown in FIGS. 5 and 6 positioned within the sleeve, while FIG. 7 shows the drum 28 removed from the sleeve 20. The shape of the drum 28 is not particularly limited, and in one embodiment, is generally in the form of a cylinder with a closed bottom, which is away from the oil inlet. In another embodiment, and as shown in the figures, the lower or bottom portion 50 of the drum 28 can have a particular profile, such as an arcuate profile, as described further herein.

The drum 28 contains a thermal actuator 30 which may be in the form of a wax motor, and which, in one embodiment, is rigidly mounted at its upper end to the oil inlet fitting 16. The interior of the actuator 30 contains a wax which expands when heated, such as for example, because of the temperature of the fluid. The actuator 30 includes a piston 32 which extends when the wax is heated and can retract when the wax cools. Therefore the piston 32 is in the extended state in FIG. 1 when the oil is hot and is in the retracted state in FIG. 2 when the oil is cold.

Figure 4:
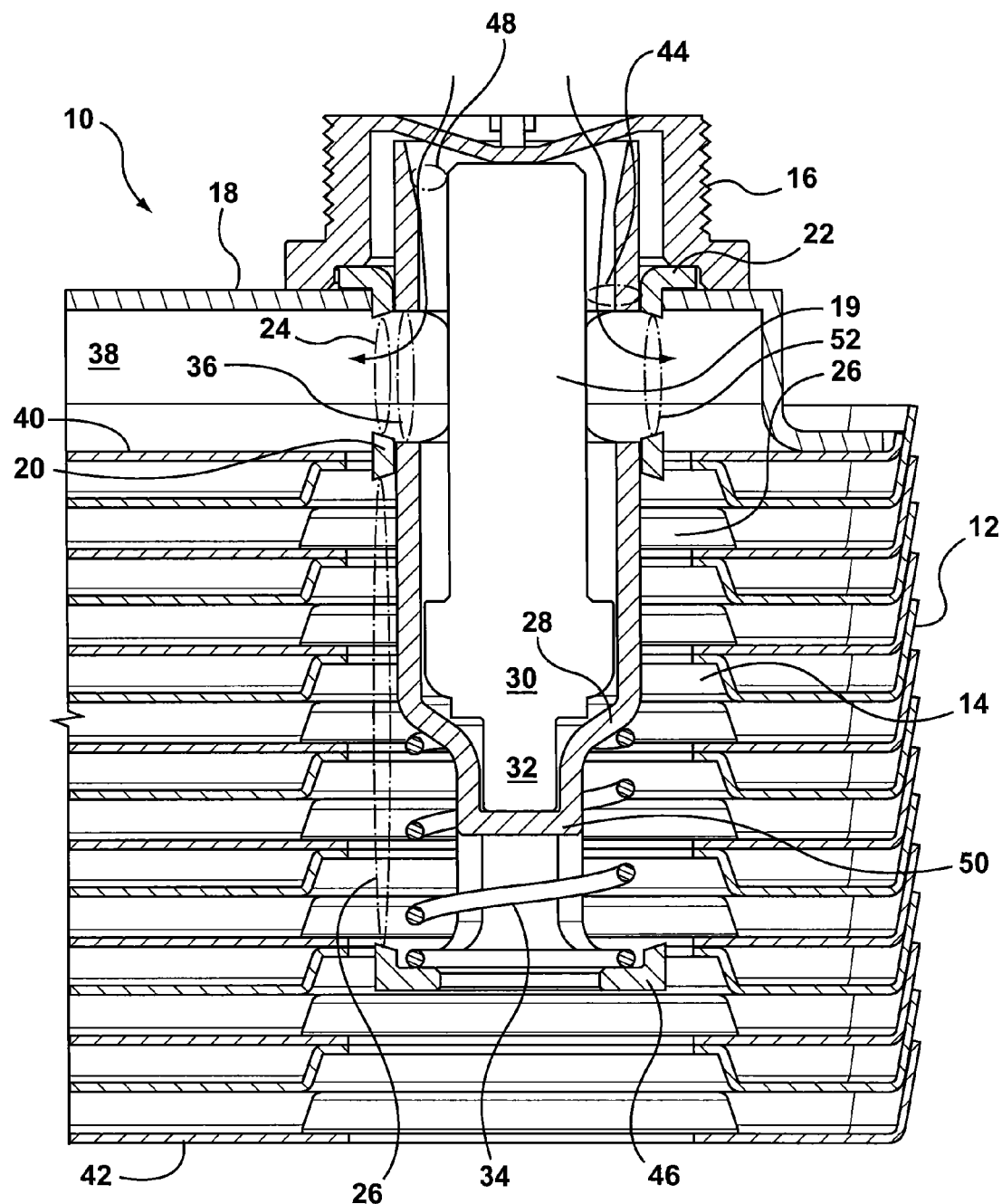
FIG. 4 shows the OTW cooler of FIG. 3 in the cold condition, with oil flowing through the bypass channel.

The piston 32 engages the drum 28 such that the drum 28 moves downwardly from a first position (as shown in FIGS. 2 and 4) to a second position (as shown in FIGS. 1 and 3) when the piston 32 extends. In the embodiment disclosed, the shape of the bottom of the drum 28 allows it to be operatively coupled to the piston 32 with the drum 28, such that the drum 28 moves in response to the piston 32. In the embodiment disclosed in the figures, the arcuate profile of the bottom of the drum 28 allows the piston 32 engage the drum 28, to operatively couple the piston 32 to the drum 28.

In a further embodiment and as disclosed herein and shown in FIGS. 1 to 4, a biasing means can be provided for biasing the drum 28 towards the first position. For example, a coil spring 34 between the outer sleeve 20 and the drum 28 pushes the drum 28 upwardly when the piston 32 retracts.

As noted above, the drum 28 is also provided with one or more apertures 36 in addition to the first aperture 48, which is in fluid communication with the inlet 44. In one embodiment, as shown in FIGS. 1 and 2, the drum 28 can be provided with second 52 and third 54 apertures (encircled); while in another embodiment, as shown in FIGS. 3, 4, 5 and 7, the drum can be provided with a second 52 aperture (encircled) only. The second 52 and third 54 apertures (when present) can be provided as a single opening or as multiple openings. Further, as shown in the figures, the second 52 and third 54 apertures can be longitudinally aligned with each other along the length of the drum 28. In an alternative embodiment, the second 52 and third 54 apertures can be offset (not shown) from each other along the length of the drum 28, so long as they allow fluid communication from the drum 28 to the slots of the outer sleeve 20 in different position of the drum, as disclosed herein.

In one embodiment of a OTW heater where the drum 28 is provided with a second 52 and third 54 apertures, with the oil in the cold condition, as shown in FIG. 2, the piston is retracted and the drum 28 is raised, so that the drum 28 blocks the upper slots 24 in the outer sleeve 20, and the second aperture 52 in the drum 28 align with the lower slots 26 of the outer sleeve 20. Therefore, a closed flow path is created to block off bypass passage 38 from the oil inlet fitting 16 to core 12, and the oil enters the oil inlet manifold 14 through aligned second aperture 52 and slots 26. Therefore the oil enters the manifold 14 and flows through the heat exchanger core 12, where it is heated by the coolant.

As the oil temperature increases, the temperature of the actuator 30 increases and the piston 32 extends to the position shown in FIG. 1. This pushes the drum 28 down so that the second aperture 52 of the drum 28 is blocked by the outer sleeve 20, and the top of the drum 28 no longer blocks the upper slots 24 in the outer sleeve 20. Therefore, in this position, the third aperture 54 aligns with the first slot 24 in the outer sleeve 20 and the hot oil enters the bypass channel 38 between the cover plate 18 and core 12, and does not enter the inlet manifold 14 of heat exchanger 10.

FIGS. 3 and 4 show, as an embodiment, a cross-out section of a portion of an OTW cooler 10 which has most of the same elements as OTW heater 10 described above. Like elements of cooler 10 are therefore described by like reference numerals. One difference in such an embodiment is that the drum 28 can be provided with only the first 48 and second 52 (encircled in FIGS. 3 and 4) apertures, with the first aperture 48 in fluid communication with the oil inlet 44 or opening in the oil inlet fitting 16 to allow oil to enter the drum 28.

In the hot condition shown in FIG. 3, with the piston 32 extended, the second aperture 52 of drum 28 is aligned with the lower slots 26 of outer sleeve 20, and the drum 28 blocks the upper slots 24. Therefore, the hot oil flows from inlet 44 to manifold 14, and then flows through core 12 where it transfers heat to the relatively cool coolant.

In the cold condition shown in FIG. 4, with the piston 32 is in the retracted position, the second aperture 52 of the drum 28 align with the upper slots 24 of the outer sleeve 20 to allow the oil to bypass the heat exchanger core 12. The drum 28 blocks oil flow to manifold 14, and therefore oil is prevented from flowing through the lower slots 26 of outer sleeve 20 and into manifold 14.

While the present invention has been described with reference to example embodiments and the accompanying drawings, it will be understood by those skilled in the art that the invention is not limited to the preferred embodiment and that various modifications could be made thereto without departing from the scope of the invention as defined by the claims.

Table of reference numerals

| | |
|---|---|
| 10 | heater |
| 12 | core |
| 14 | oil inlet manifold |

-continued

Table of reference numerals

| | |
|---|---|
| 16 | oil inlet fitting |
| 18 | bypass channel cover plate |
| 19 | thermal bypass valve (TBV) |
| 20 | outer sleeve |
| 22 | lip |
| 24 | upper slots |
| 26 | lower slots |
| 28 | drum |
| 30 | thermal actuator |
| 32 | piston |
| 34 | coil spring |
| 36 | one or more apertures |
| 38 | bypass channel |
| 40 | flat plate |
| 42 | bottom dish plate |
| 44 | oil inlet |
| 46 | bottom end of sleeve |
| 48 | first aperture |
| 50 | bottom portion of drum |
| 52 | second aperture |
| 54 | third aperture |

The invention claimed is:

1. A heat exchanger apparatus comprising:
a heat exchanger including
   a plurality of plates defining a first fluid channel, a second fluid channel and a bypass channel;
   a first fluid inlet manifold having a first fluid inlet and a first fluid outlet manifold having a first fluid outlet, the first fluid inlet manifold and the first fluid outlet manifold being in fluid communication with the first fluid channel; and, the first fluid inlet manifold also being in fluid communication with the bypass channel; and
a thermal bypass valve positioned in the first fluid inlet manifold, the thermal bypass valve including:
   a sleeve having a first slot and a second slot, the first slot permitting fluid flow from the first fluid inlet to the bypass channel, and the second slot permitting fluid flow from the first fluid inlet to the first fluid inlet manifold;
   a drum positioned within the sleeve and slidably movable from a first position to a second position, the drum having a first aperture and one or more additional apertures, the first aperture in fluid communication with the first fluid inlet and the one or more additional apertures directing a first fluid to the first slot in the first position or the second slot in the second position;
   a thermal actuator engaging the drum and actuating the drum to move from the first position to the second position in response to the temperature of the first fluid, and
a fitting at the first fluid inlet,
   and wherein the sleeve further comprises a lip positioned between the fitting and a bypass channel cover plate.

2. The heat exchanger apparatus of claim 1, wherein the one or more additional apertures includes a second aperture, and the second aperture permitting first fluid flow to the first slot in the first position and to the second slot in the second position.

3. The heat exchanger apparatus of claim 1, wherein the one or more additional apertures comprises a second aperture and a third aperture, wherein in the first position, the second aperture permitting first fluid flow to the second slot and the drum preventing flow to the first slot, and in the second position, the third aperture permitting first fluid flow to the first slot and the drum preventing flow to the second slot.

4. The heat exchanger according to claim 1, wherein the actuator is coupled to the fitting.

5. The heat exchanger according to claim 1, wherein the actuator comprises a motor containing a thermally expandable contractable material coupled to a piston.

6. The heat exchanger according to claim 5, wherein the piston engages the drum and moves from a first piston position to a second piston position and back to the first piston position in response to the thermal expansion and contraction of the thermally expandable contractable material.

7. The heat exchanger according to claim 5, wherein the thermally expandable contractable material is wax.

8. The heat exchanger according to claim 1, further including a biasing means for biasing the drum in the first position.

9. The heat exchanger according to claim 8, wherein the biasing means is a spring.

10. The heat exchanger according to claim 1, wherein an end of the drum has an arcuate profile for operatively coupling the drum to the thermal actuator.

11. The heat exchanger according to claim 1, wherein the fitting has an opening for permitting fluid flow to the first fluid inlet.

12. A thermal bypass valve in an inlet manifold of a heat exchanger, comprising:
   a sleeve having a first slot and a second slot;
   a drum positioned within the sleeve and slidably movable from a first position to a second position, the drum having a first aperture and one or more additional apertures, the first aperture in fluid communication with a first fluid inlet and the one or more additional apertures directing fluid to the first slot in the first position or the second slot in the second position; and
   a thermal actuator engaging the drum and actuating the drum to move from the first position to the second position in response to the temperature of a first fluid; and
   wherein the sleeve further comprises a lip positioned between a fitting and a bypass channel cover plate of the heat exchanger.

13. The thermal bypass valve of claim 12, wherein the one or more additional apertures includes a second aperture, and the second aperture permitting first fluid flow to the first slot in the first position and to the second slot in the second position.

14. The thermal bypass valve of claim 12, wherein the one or more additional apertures comprises a second aperture and a third aperture, wherein in the first position, the second aperture permitting first fluid flow to the second slot and the drum preventing flow to the first slot, and in the second position, the third aperture permitting first fluid flow to the first slot and the drum preventing flow to the second slot.

15. The thermal bypass valve according to claim 12, wherein the actuator includes a motor containing a thermally expandable contractable material coupled to a piston.

16. The thermal bypass valve according to claim 15, wherein the piston engages the drum and moves from a first piston position to a second piston position and back to the first piston position in response to the thermal expansion and contraction of the thermally expandable contractable material.

17. The thermal bypass valve according to claim 15, wherein the thermally expandable contractable material is wax.

18. The thermal bypass valve according to claim 12, wherein an end of the drum has an arcuate profile for operatively coupling the drum to the thermal actuator.

* * * * *